March 24, 1925.
M. O. SNEDIKER
REGULATING APPARATUS
Filed March 19, 1923    2 Sheets-Sheet 1
1,530,917
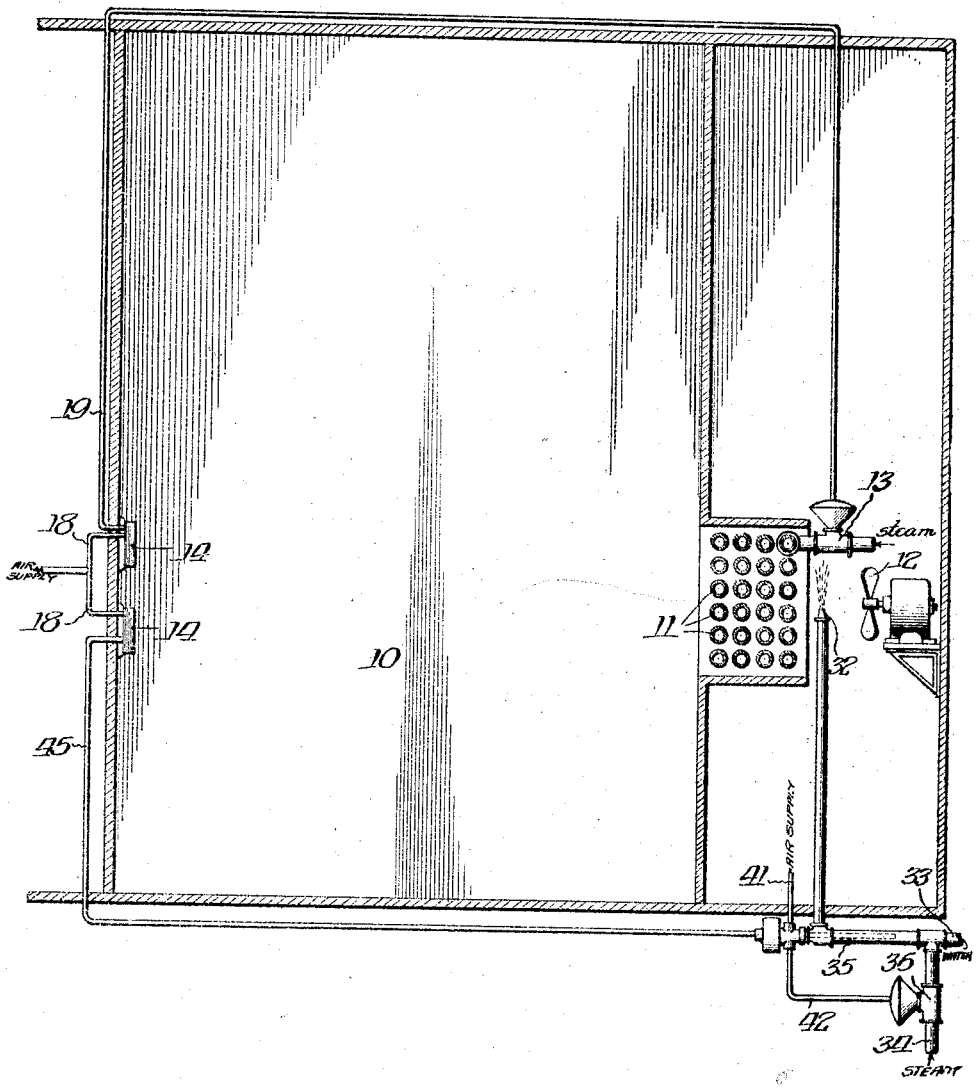

March 24, 1925.  1,530,917
M. O. SNEDIKER
REGULATING APPARATUS
Filed March 19, 1923  2 Sheets-Sheet 2
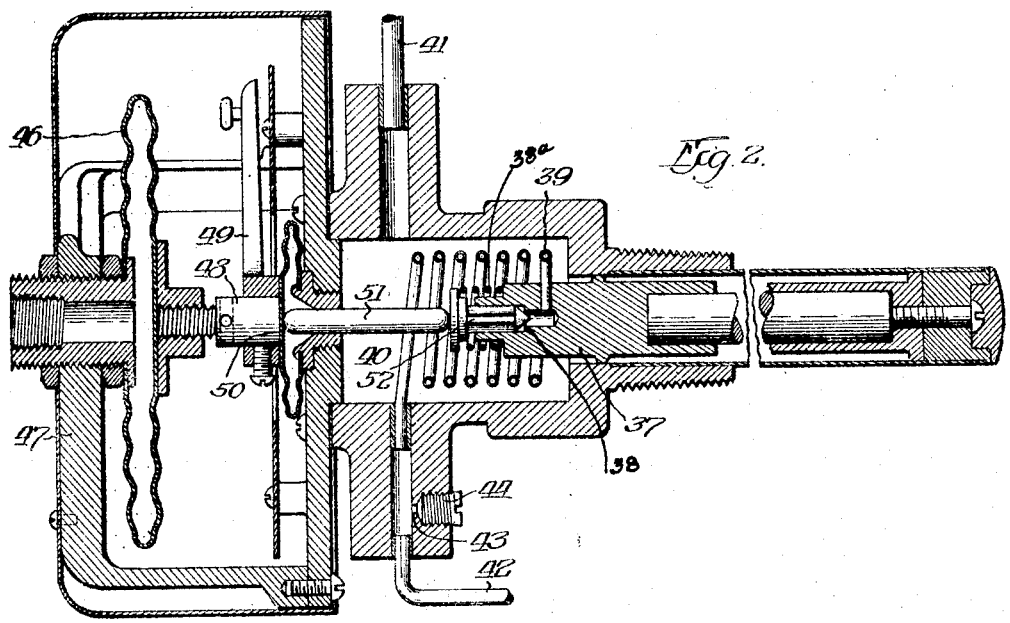

Patented Mar. 24, 1925.

1,530,917

UNITED STATES PATENT OFFICE.

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS.

REGULATING APPARATUS.

Application filed March 19, 1923. Serial No. 626,246.

*To all whom it may concern:*

Be it known that I, MORTON O. SNEDIKER, a citizen of the United States, and resident of Chicago, in the county of Cook and State of Illinois, have invented certain new and useful Improvements in a Regulating Apparatus, of which the following is a specification.

My invention relates to thermostatic regulation and particularly to novel means adapted for employment in the controlling of relative humidity in rooms.

One of the objects of my invention is to improve the means employed for maintaining relative humidity and to adapt such means for use in rooms in which operations are carried on requiring the maintenance of certain specified air conditions.

It is, of course, well known that slight variations in the dry air temperature necessitates relatively greater variations in the moisture content of the air in order to maintain a constant relative humidity. In the carrying out of certain operations particularly in the treatment of silk, cotton, etc. it is necessary to maintain a predetermined relative humidity notwithstanding an increase in out-door temperature to a point above the predetermined normal for the room. This improvement has to do with means influenced by changes in the dry air temperature for immediately changing the moisture content of the air delivered to the desired space. The mechanism includes, as the principal element in the combination, a pair of thermostats, one influenced by the dry air temperature, the other influenced and serving to maintain constant the temperature of a supply of water for delivery with the incoming air, the dry air thermostat serving to modify the action of the liquid control thermostat. As a result of the use of this apparatus a slight change in the dry air temperature effects a material change in the temperature of the water supplied to the space under control; consequently the amount of moisture taken up, due to a variation in the degree of vaporization, is varied to a degree sufficient to maintain constant the relative humidity.

The invention will be more readily understood by reference to the accompanying drawings, wherein:

Figure 1 is a view partly diagrammatic in form, illustrating the application of apparatus such as contemplated;

Figure 2 is a longitudinal sectional view through one of the regulators employed; and Figure 3 is a similar view through the other thermostatic regulator.

Referring particularly to Figure 1, it will be seen that the apparatus is shown installed in connection with walls providing a room 10 adapted to be heated by steam coils 11, air being blown into the room over the coils by means of the motor-driven fan 12. A steam valve 13 is controlled by means of a thermostat 14 mounted within the room. The thermostat may be of the type shown in Figure 3, the construction and operation of which are well known in the art but which for convenience will be briefly described.

The thermostat comprises a casing 15 having a compressed air inlet passage 16 and an outlet passage 17. A pipe 18 is connected with a suitable source of air supply while the pipe 19 is connected to the valve 13. Mounted in the casing 15 is a bellows 20 containing a thermo-sensitive liquid, one wall of the bellows being rigidly connected to an arm 21, the lower end of which is supported on an adjusting bolt 22. At an intermediate point a second adjusting element 23 acts as a fulcrum and provides for the fine adjustment as required.

The other wall of the bellows is connected through a member 24 to a flexible diaphragm 25 secured to the casing. The member 24 provides a valve seat 26 and an exhaust port 27. A valve 28 cooperates with the valve seat 26 and is located in a chamber 29 in the casing 15 and in communication with the outlet passage 17. The passages 16, 17, are placed in and out of communication by means of a valve 30, contacting the valve 28 and normally held in seated position by means of a spring 31. In the position of the parts shown in Figure 3, the steam supply valve would be in a static condition. However, upon an increase in temperature in the room the bellows would be expanded and the motion thereof would serve to open the valve 30, permitting air pressure to pass into the pipe 19 to the valve 13 and to close the same. As the temperature drops due to the shutting off of the steam, the first action due to the contraction of the thermostatic element is the closing of the valve 30. Further contraction of the bellows due to the movement of the valve 28 out of contact with the valve 30 is the opening of the valve 28 permitting escape of the air pressure through the port 27 and the opening of the steam valve 13.

This provides for the control of the dry air temperature within the room 10. However, in order to control the relative humidity, means such as the spray 32 are provided, water being supplied through the pipe 33 and steam for modifying the temperature of the water through the pipe 34. A thermostatic element 35 is inserted in the spray pipe and the action of this thermostat controls the supply of steam through the valve 36. The thermostat for effecting this operation is illustrated in detail in Figure 2.

For convenience the thermostatic element comprises two materials of different degrees of expansibility under heat, the inner element 37 which is relatively movable carrying a valve seat 38 in communication with a coil 39 of flexible pipe located within a chamber 40 which is in constant communication with a source of maintained air pressure through a pipe 41. The coil of pipe 39 is in communication with an outlet pipe 42 connected to the steam valve 36, an expansion spring, 38ª tends to unseat the valve member 52.

In the thermostat just described, an increase in temperature of the water supply results in a movement of the thermostatic element 37 and a partial opening of the valve 52. This permits the escape of air from the chamber 40 through the coil of the pipe 39, into the pipe 42 which effects the partial closing of the steam valve 36. In order to prevent too abrupt movement of the steam valve and to assist in maintaining a balanced condition as required, I provide a constantly open air escape port 43 controlled by a set screw 44, by means of which the area of the escape opening is limited to the desired extent.

In the event that the dry air temperature in the room were maintained absolutely constant, a predetermined temperature of water to the spray could be maintained and the relative humidity would therefore be constant. However, variations in the dry air temperature due to excessive out-door temperatures cannot be avoided and in order to maintain the desired constant relative humidity it is necessary to materially change the temperature of the spray water immediately following changes in the dry air temperature. To that end I provide means for modifying the action of the water control thermostat by the dry air thermostat. This means comprises a second thermostat 14 which is a duplicate of that shown in Figure 3 and which might, except for practical considerations, be accomplished by the use of one instrument instead of the two shown in Figure 1. However, the second thermostat 14, shown in Figure 1, has the same air supply pipe 18 and an air discharge pipe 45 which communicates with the bellows 46 shown in Figure 2. One wall of the bellows is fixed in a frame 47 rigidly held while the other wall carries a threaded plunger 48 which may have an adjusting finger 49 secured thereto. The plunger rests against the movable wall 50 of a sealing-bellows and contacts a stem 51 which bears at its inner end against a valve 52 which controls the port 38. It will be seen that upon an increase in dry air temperature in the room the air pressure permitted by the thermostat to enter the pipe 45 will be exerted in the bellows 46 and the force thereof transmitted to the stem 51 tending to more firmly seat the valve 52. Therefore a much greater increase in water temperature must occur before the sufficient elongation of the thermostatic element will take place to open the valve 52 and effect the shuttng off of the steam valve 36. Thus upon an increase of temperature in the room the water temperature in the spray is materially increased and although the temperature of the heating coils will be immediately reduced due to the action of the dry air thermostat the higher water temperature will enable the taking up of a greater amount of water and serve to maintain the relative humidity.

No attempt is made herein to claim the system of maintaining the relative humidity. The appended claims are directed to the apparatus by which the action of one thermostat is modified by the action of a second thermostat controlled by a different medium.

I claim:

1. In a thermostat the combination of a thermo-sensitive element, a source of fluid under pressure, a heat-controlling valve, means operable by said thermo-sensitive element for controlling the action of said fluid under pressure on said heat-controlling valve, and means operable by a second thermostat for changing the adjustment of said thermo-sensitive element on the fluid under pressure.

2. In a thermostat the combination of a thermo-sensitive element, a source of fluid under pressure, a heat-controlling valve, means operable by said thermo-sensitive element for controlling the action of said fluid under pressure on said heat-controlling valve, and means operable by a second distantly located thermostat for changing the adjustment of said thermo-sensitive element on the fluid under pressure.

3. In means of the class described, the combination of a thermostat adapted to be interposed in a conduit for a body of fluid, means for supplying heat to said body of fluid, a valve affected by the movement of said thermostat, said valve controlling the supply of heat to said body of fluid, a plunger abutting said valve, a diaphragm bellows, a movable portion of which is in contact with said plunger, and a second, distantly-located thermostat acting on said diaphragm bellows to position said plunger in its relation to said valve.

4. In a device of the class described, the combination of a thermostatic element, a valve movable relative thereto and controlling the supply of heat to a space, a plunger abutting said valve, a diaphragm bellows, a movable wall of which abuts said plunger, and a second, distantly-located thermostat acting on said bellows to position said plunger and thereby to change the adjustment of said first thermostatic element.

5. In a device of the class described, the combination of a casing having an inlet and an outlet for fluid under pressure, a thermostatic element movable relative to said casing, a valve cooperating with and movable relative to said element, a flexible tube providing communication between said element at one side of said valve and the outlet from said casing, valve-operating means independent of said thermostatic element, a second, distantly-located thermostat which is thermally responsive to an independent heat condition, and means operable by said second thermostat for positioning said valve-operating means.

6. In regulating apparatus, the combination of a thermostat having a movable thermostatic element, a valve primarily controlled by the movement of said element, said valve serving to regulate a supply of heat to a space, a secondary control for said valve, consisting of means acting in opposition to said thermostatic element, a second, distantly-located thermostat, and a diaphragm bellows actuated by said second thermostat for moving said secondary valve-control means.

7. In a thermostatic device, the combination of a thermostatic element, a valve associated therewith and adapted to control a supply of heat, a plunger acting on said valve in opposition to said thermostatic control, manually operable means for positioning said plunger, a diaphragm bellows acting through said manually operable means to vary the position of said plunger, and a second, distantly-located thermostatic element for actuating said diaphragm bellows.

Signed at Chicago, Illinois, this 16th day of March, 1923.

MORTON O. SNEDIKER.